Aug. 6, 1935.  L. M. WORTH ET AL  2,010,618
OVEN ILLUMINATING DEVICE
Filed March 19, 1934  2 Sheets-Sheet 1
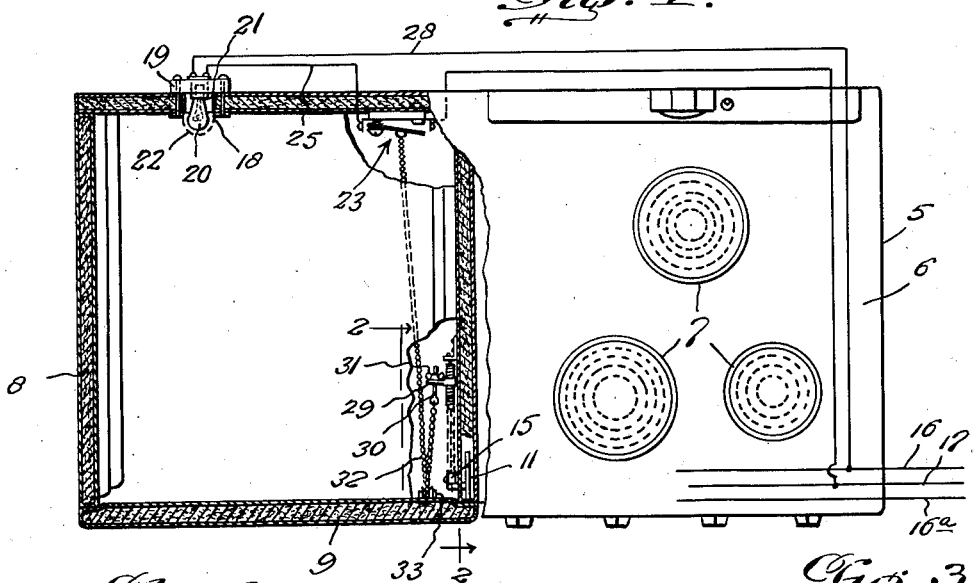
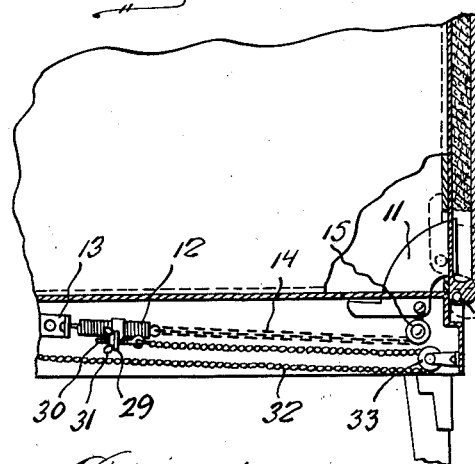
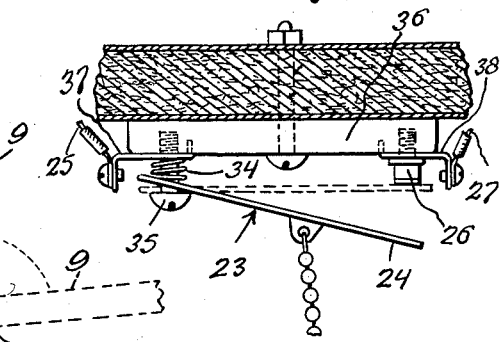
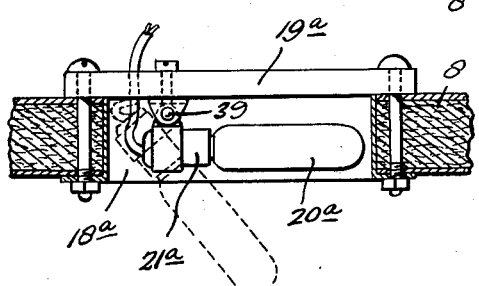
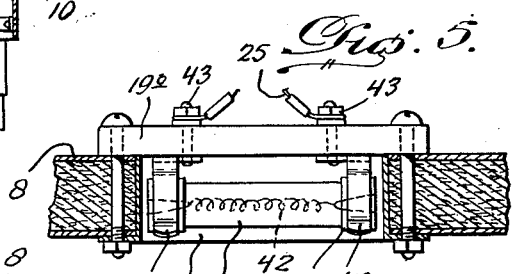
Inventors
Luella M. Worth,
Homer E. King,
By J. Stanley Burch
Attorney

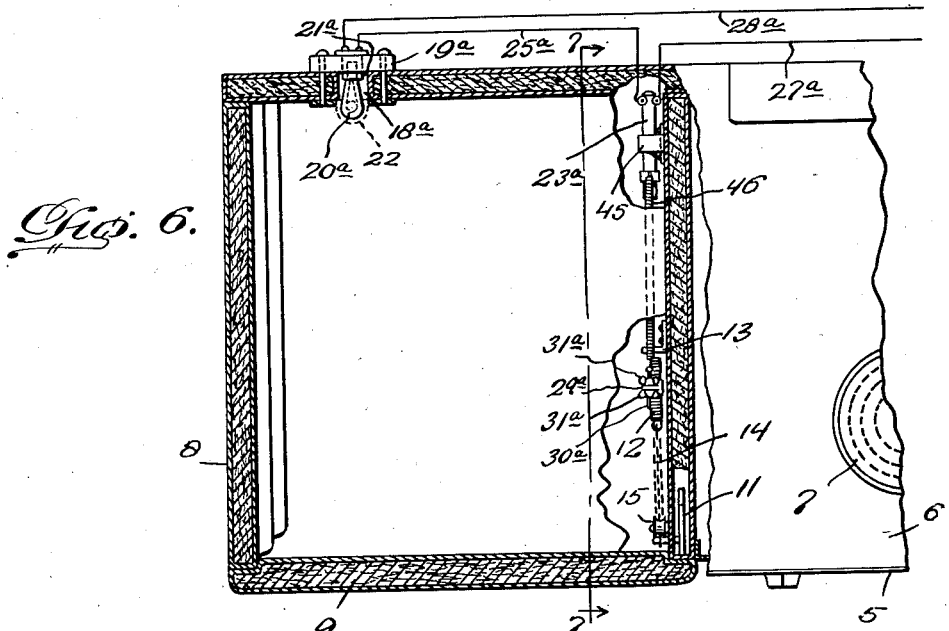
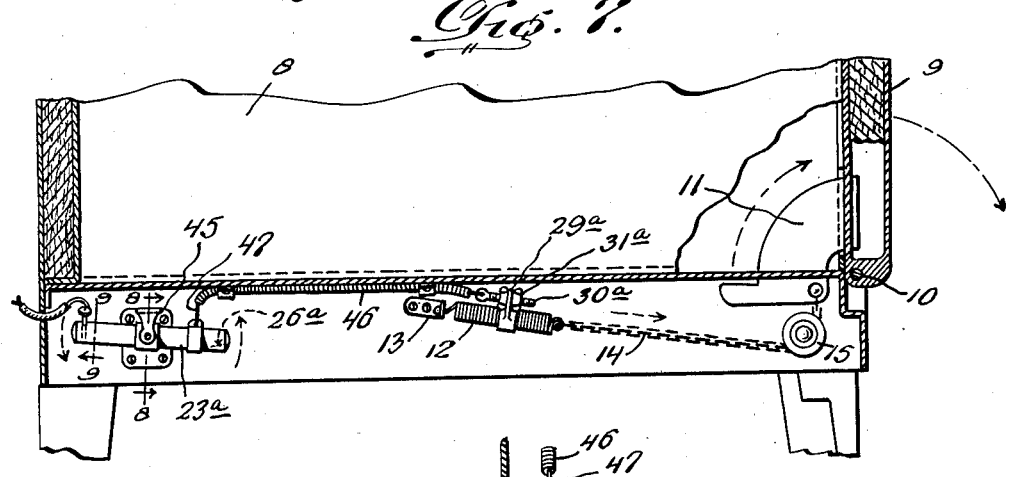
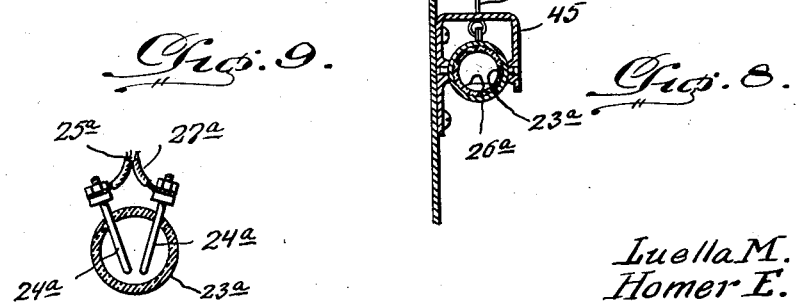

Patented Aug. 6, 1935

2,010,618

UNITED STATES PATENT OFFICE 2,010,618

OVEN ILLUMINATING DEVICE

Luella M. Worth and Homer E. King, Sidney, N. Y., assignors of one-sixth to George E. Hazard, Sidney, N. Y., and one-sixth to Charles L. Hilsinger, Oneonta, N. Y.

Application March 19, 1934, Serial No. 716,412

3 Claims. (Cl. 240—5)

This invention relates to an improved device for illuminating the interior of the oven of a domestic cooking range to facilitate inspection of the food being baked therein.

The primary object of the present invention is to provide a simple and efficient device of the above kind embodying an electric lamp mounted to illuminate the interior of the oven, a switch for controlling the circuit of said lamp, and novel means including an operative connection between said switch and the door of said oven to automatically open the switch and break the circuit of said lamp when said door is closed and to automatically close the switch and make the circuit of said lamp when said door is opened.

A further object is to provide a device of the above kind which may be readily installed upon existing cooking stoves with slight alteration of the latter, and wherein the lamp is readily accessible and removable for renewal although effectively protected against breakage under ordinary conditions of use.

A still further object is to provide a device of the above kind particularly adapted for installation upon stoves whose ovens are provided with outwardly and downwardly opening swinging doors equipped with yieldable counter-balancing means acting to hold the doors closed and to resist sudden opening of the latter.

Other objects and features of the invention will become apparent from the following description when considered in connection with the accompanying drawings, in which:—

Figure 1 is a view of an electric cooking range equipped with an oven illuminating device embodying the present invention, the range being shown partly in plan and partly broken away and in horizontal section.

Figure 2 is a fragmentary vertical section on the plane of line 2—2 of Figure 1, with parts broken away.

Figure 3 is an enlarged fragmentary horizontal section of the construction shown in Fig. 1, showing details of the switch for controlling the circuit of the oven illuminating lamp.

Figure 4 is an enlarged fragmentary horizontal section showing a modified form of lamp and mounting therefor.

Figure 5 is a view similar to Fig. 4 showing a further modified form of lamp and mounting therefor.

Figure 6 is a view somewhat similar to Figure 1 showing a modified form of switch and operating means therefor.

Figure 7 is an enlarged fragmentary vertical section on the plane of line 7—7 of Figure 6, with parts broken away.

Figure 8 is a section on line 8—8 of Figure 7; and

Figure 9 is a section of the switch on line 9—9 of Figure 7.

Referring in detail to the drawings, 5 indicates a conventional type of electric domestic cooking range having a top plate 6 at one side provided with the usual radiating heaters 7, and provided at the other side with a heat-insulated oven 8 having a front door 9 hinged at its lower end, as indicated at 10, to swing outwardly and downwardly to open position. The door 9 has a suitable bracket arm 11 to limit opening movement thereof to a substantially horizontal position, and yieldable means is provided to counterbalance the door 9 so as to hold the latter closed and to prevent sudden opening thereof. This counterbalancing means usually consists of a helical tension spring 12 attached at one end to an angle bracket 13 secured to the stove at one side of and beneath the bottom of the oven, the other end of said spring being connected to the stop arm 11 by a flexible member or chain 14 extending forwardly from spring 12 to and around a guide pulley 15 and then upwardly to said arm 11. Suitable heating means, not shown, is provided for oven 8, but disclosure thereof or of further details of the stove construction is not made because the same is unnecessary to an understanding of the present invention. The feed wires 16 and 16a and the return wire 17 for the heating elements of the stove are diagrammatically shown in Figure 1.

In the embodiment of the invention illustrated in Figures 1 to 3 inclusive, a wall, preferably the back wall, of the oven 8 is provided with an opening 18 over the outer side of which is secured a plate 19 of insulating material having means to removably mount an electric lamp 20 thereon so that said lamp is supported in the opening 18 in position to direct its rays into and illuminate the interior of the oven. In Figure 1, the lamp mounting consists of a threaded socket 21 arranged for reception of the threaded base of an ordinary lamp so that the lamp projects inwardly from plate 19. If the lamp projects into the oven when mounted in this way, it may be protected against breakage by a suitable transparent guard as indicated at 22. Mounted on the back of the stove beneath the bottom of oven 8 is a switch 23 for controlling the circuit of lamp 20, said switch having a movable contact 24 connected by wire 25 with one terminal of socket 21, and a stationary contact 26 connected by wire 27 with the return wire 17. The other terminal of socket 21 is connected by wire 28 with the feed wire 16.

Attached to the tension spring 12 intermediate the ends of the latter is a lateral arm 29 having an aperture through which freely extends a threaded stem 30 on one end of which is adjustably threaded a wing nut 31, the other end of said steam being attached to one end of a flexible member 32 whose other end is attached to the movable contact 24. The flexible member may be the movable wire of a Bowden wire control, but in this form of the invention is shown as a bead chain passing forwardly from arm 29 to and around a guide pulley 33, mounted on the front apron of the stove, and then extending rearwardly to the contact 24 to which it is attached. A helical compression spring 34 acts to yieldingly move the contact 24 to its rearward circuit closing position in engagement with contact 26 as shown by dotted lines in Figure 3, and contact 24 has an aperture in one end through which a bolt 35 loosely extends, the bolt 35 being threaded into an insulating base 36 fastened to the stove and carrying contact 26, and the spring 34 encircling bolt 35 between a conductor strip 37 and the apertured end of contact 24. The strip 37 has wire 25 secured thereto, and the wire 27 is secured to a similar strip 38 extending from contact 26.

In operation, opening of door 9 causes movement of stop arm 11 so as to pull upon the chain 14 and stretch the spring 12, thereby causing forward movement of arm 29 and placing slack in chain 32. This slack is taken up by rearward movement of contact 24 under the action of spring 34, and when such contact engages contact 26, the circuit of lamp 20 is closed so that the latter is lighted for illuminating the interior of the oven. The arrangement is such that the contact 24 engages contact 26 when the door 9 is only partially opened to an extent sufficient to permit inspection of the food in the oven, thereby making it unnecessary to fully open the door in order to illuminate the oven and permit proper inspection of the food. When the door 9 is closed, slack is placed in chain 14 so as to permit contraction of spring 12, and this causes rearward movement of arm 29 so as to exert a pull on chain 32 and move the contact 24 away from contact 26 against the action of the weaker spring 34, thereby opening the circuit of and extinguishing the lamp 20. The adjustment of stem 30 by means of nut 31 properly determines the position of contact 24 relative to contact 26 when the oven door is closed, and regulates the degree of opening of door 9 necessary to close the circuit of lamp 20. While it is preferred to move the contact 24 forwardly to circuit-opening position, rearward movement of contact 24 may be utilized to open the circuit of lamp 20 by arranging contact 26 in front of the free end of contact 24, in which case the pulley 33 may be omitted by reversing the stem 30 and using the chain 32 as a direct connection between contact 24 and said stem 30.

In Figure 4, the plate 19a has a socket 21a hinged thereto as at 39, and a slim elongated lamp 20a is engaged in this socket to normally extend parallel with the adjacent wall of the oven entirely within the opening 18a in said wall, said opening being in the form of an elongated slot. This renders the use of a lamp guard unnecessary, and the hinge at 39 allows the lamp 20a and socket 21a to swing forwardly out of slot 18a so that the lamp may be readily inserted or removed relative to said socket.

In Figure 5, spaced clips 40 are carried by the plate 19b for retaining engagement with the end terminal caps 41 of a special cartridge type of electric lamp 20b, in which said caps are fitted on the ends of a tubular glass body and connected by a straight filament 42 disposed axially of said body. The wires 25 and 28 are electrically connected to the respective clips 40 as at 43, and the lamp 20b is removably held by said clips entirely within the opening or slot 18b in the oven wall.

In the embodiment shown in Figures 6 to 9 inclusive, a mercury tube switch 23a is pivotally mounted, by suitable means 45 on the stove beneath the rear portion of the oven 8, for vertical rocking movement. The switch 23a has spaced contacts 24a adapted to be bridged by a body of mercury 26a, when said switch is tilted to lower the end thereof carrying the contacts 24a, so as to close the circuit of oven lamp 20a. Wire 25a connects one of the contacts 24a with one terminal of socket 21a, and the other contact 24a is connected to a return wire by wire 27a, the other terminal of socket 21a being connected with a feed wire by wire 28a. Socket 21a is carried by plate 19a secured over the opening 18a in a wall of the oven. In this embodiment of the invention, a Bowden wire control operatively connects the switch 23a with the tension spring 12 of the counterbalancing means for door 9, said control comprising a guide tube 46 secured to the stove beneath the oven and extending from a point adjacent spring 12 to a point adjacent the switch 23a, and a flexible wire 47 slidable in the tube 46 and having its opposite ends respectively attached to the lateral arm 29a carried by spring 12 and to an end of switch 23a. The arm 29a has an aperture through which loosely extends a threaded stem 30a attached at one end to an end of wire 47 and having a wing nut 31a adjustably threaded on the other end thereof. It will be seen that when door 9 is closed the spring 12 contracts and moves wire 47 in a direction to tilt switch 23a so that the mercury 26a leaves contacts 24a, thereby breaking the circuit of lamp 20a. On the other hand, when door 9 is opened, the spring 12 is stretched so that a pull is exerted on wire 47 in a direction to tilt switch 23a in an opposite direction whereby the end carrying contacts 24a is lowered. This causes the mercury 26a to run to this end and bridge contacts 24a, thereby closing the circuit of lamp 20a.

It will be seen that the invention is simple and inexpensive to manufacture, and may be readily installed so as to not detract from the appearance of the stove. Minor changes are contemplated within the spirit of the invention as claimed.

What we claim as new is:

1. In an electric cooking range, the combination with an oven having a hinged door mounted to swing outwardly and downwardly to open position, and counterbalancing means for said door including a tension spring and a flexible member connecting said spring with the door so that said spring is placed under tension when the door is opened, of an illuminating device for said oven comprising a lamp set in a wall of the oven, a switch for controlling the circuit of said lamp mounted upon the range beneath the bottom of said oven, and means including an operative connection between said switch and the tension spring of said door counterbalancing means to automatically open the switch and break the circuit of said lamp when said door is closed and to automatically close the switch and make the circuit of said lamp when said door is opened, said switch having a contact movable to circuit opening and circuit closing positions and normally yieldingly moved to one of said positions, said operative connection between the switch and the oven door acting to move said contact to its other position upon movement of the door in one direction, and allowing movement of said contact to its normal position when the door is moved in the opposite direction.

2. In an electric cooking range, the combination with an oven having a hinged door mounted to swing outwardly and downwardly to open position, and counterbalancing means for said door including a tension spring and a flexible member connecting said spring with the door so that said spring is placed under tension when the door is opened, of an illuminating device for said oven comprising a lamp set in a wall of the oven, a switch for controlling the circuit of said lamp mounted upon the range beneath the bottom of said oven, and means including an operative connection between said switch and the tension spring of said door counterbalancing means to automatically open the switch and break the circuit of said lamp when said door is closed and to automatically close the switch and make the circuit of said lamp when said door is opened, a pulley mounted on the range beneath the front part of the oven, said operative connection including a flexible operating member passing around said pulley and having one end attached to the tension spring of said door counterbalancing means, the other end of said flexible member being attached to a movable contact of said switch.

3. In an electric cooking range, the combination with an oven having a hinged door mounted to swing outwardly and downwardly to open position, and counterbalancing means for said door including a tension spring and a flexible member connecting said spring with the door so that said spring is placed under tension when the door is opened, of an illuminating device for said oven comprising a lamp set in a wall of the oven, a switch for controlling the circuit of said lamp mounted upon the range beneath the bottom of said oven, means including an operative connection between said switch and the tension spring of said door counterbalancing means to automatically open the switch and break the circuit of said lamp when said door is closed and to automatically close the switch and make the circuit of said lamp when said door is opened, a pulley mounted on the range beneath the front part of the oven, said operative connection including a flexible operating member passing around said pulley and having one end attached to the tension spring of said door counterbalancing means, the other end of said flexible member being attached to a movable contact of said switch, said switch opening and closing means further including spring means to normally yieldingly move the movable contact of said switch to circuit closing position, and adjusting means for said flexible member to regulate the normal circuit opening position of said movable contact when the oven door is closed.

LUELLA M. WORTH.
HOMER E. KING.